(12) United States Patent
Carney

(10) Patent No.: US 7,089,728 B2
(45) Date of Patent: Aug. 15, 2006

(54) SINGLE-PIECE TURBINE ROTOR AND PINION GEAR AND MANUFACTURING TECHNIQUE FOR SAME

(75) Inventor: Michael Carney, York, ME (US)

(73) Assignee: Ingersoll-Rand Energy Systems Corporation, Portsmouth, NH (US)

( * ) Notice: Subject to any disclaimer, the term of this patent is extended or adjusted under 35 U.S.C. 154(b) by 128 days.

(21) Appl. No.: 10/738,935

(22) Filed: Dec. 17, 2003

(65) Prior Publication Data

US 2005/0132695 A1    Jun. 23, 2005

(51) Int. Cl.
*F02C 3/00* (2006.01)
*F02C 7/36* (2006.01)

(52) U.S. Cl. ..................... 60/39.511; 148/524

(58) Field of Classification Search ............. 60/39.511; 148/524, 525, 530
See application file for complete search history.

(56) References Cited

U.S. PATENT DOCUMENTS

| | | | | |
|---|---|---|---|---|
| 3,188,479 A | * | 6/1965 | Wood et al. | ............... 290/4 R |
| 3,440,038 A | * | 4/1969 | Araki | ...................... 420/42 |
| 3,490,746 A | * | 1/1970 | Bell, III | ................... 415/177 |
| 3,703,076 A | * | 11/1972 | Hagemeister | ............ 60/39.163 |
| 4,333,670 A | * | 6/1982 | Holko | ................... 285/148.12 |
| 6,250,897 B1 | | 6/2001 | Thompson et al. | |
| 6,291,086 B1 | | 9/2001 | Nguyen-Dinh | |
| 6,307,278 B1 | | 10/2001 | Nims et al. | |
| 6,324,831 B1 | | 12/2001 | Izadi et al. | |
| 6,363,706 B1 | * | 4/2002 | Meister et al. | ............... 60/774 |
| 6,749,518 B1 | * | 6/2004 | Carrier et al. | ............. 464/183 |
| 2002/0005428 A1 | | 1/2002 | Claxton | |
| 2002/0136659 A1 | | 9/2002 | Staubli et al. | |
| 2003/0059295 A1 | | 3/2003 | Olsen | |

FOREIGN PATENT DOCUMENTS

| | | | |
|---|---|---|---|
| DE | 8236781 | | 11/1983 |
| EP | 0368642 | | 5/1990 |
| EP | 1002935 | | 5/2000 |
| EP | 1298296 | | 4/2003 |
| EP | 1394387 | | 3/2004 |
| JP | 57-77078 | * | 5/1980 |

* cited by examiner

*Primary Examiner*—Ted Kim
(74) *Attorney, Agent, or Firm*—Michael Best & Friedrich LLP

(57) ABSTRACT

A power transfer assembly comprises a power turbine constructed of a nickel alloy; a gear shaft constructed of a low-carbon carburized gear material; and a transition portion between and welded to each of the power turbine and gear shaft. The nickel alloy may be welded to the transition portion by inertia welding, and the low-carbon carburized gear material may be welded to the transition portion by electron beam welding, for example. The power transfer assembly may be used in a microturbine engine, for example, to transfer rotation of a power turbine to an electric generator.

7 Claims, 6 Drawing Sheets

SINGLE-PIECE TURBINE ROTOR AND PINION GEAR AND MANUFACTURING TECHNIQUE FOR SAME

FIELD OF THE INVENTION

The invention relates to a single-piece turbine rotor and pinion gear, and a manufacturing technique for the same.

BACKGROUND OF THE INVENTION

It is typically thought to be very difficult or impossible to weld a high-nickel alloy material to a low-carbon carburized gear material while maintaining acceptable tolerances for most machines.

SUMMARY OF THE INVENTION

The invention provides a power transfer assembly comprising a power turbine constructed of a nickel alloy; a gear shaft constructed of a low-carbon carburized gear material; and a transition portion between and welded to each of the power turbine and gear shaft. The nickel alloy may be welded to the transition portion by inertia welding, and the low-carbon carburized gear material may be welded to the transition portion by electron beam welding, for example. The power transfer assembly may be used in a microturbine engine, for example, to transfer rotation of a power turbine to an electric generator.

The invention also provides a method for manufacturing a power transfer assembly, the method comprising: constructing a turbine wheel of a nickel alloy; constructing a transition portion of a high-carbon steel; constructing a gear shaft of a low-carbon carburized gear steel; inertia welding the transition portion to the turbine wheel; and electron beam welding the gear shaft to the transition portion. The transition portion may be formed by first inertia welding a stub shaft to the turbine wheel and then cutting the stub shaft and machining the stub shaft into the dimensions of the transition portion.

Other features and advantages of the invention will become apparent to those skilled in the art upon review of the following detailed description, claims, and drawings.

Figure 1:
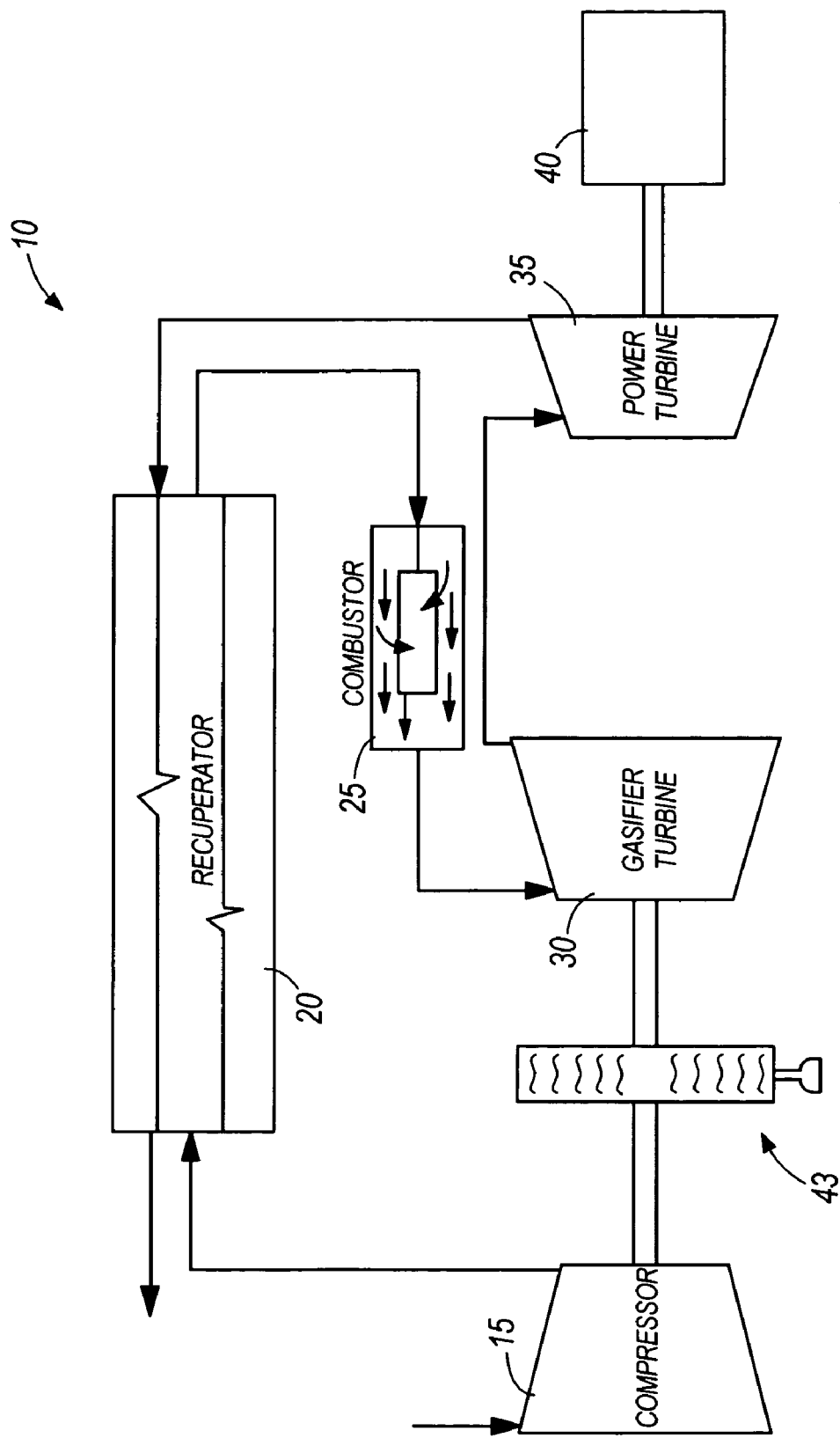
FIG. 1 is a schematic representation of a combustion turbine engine having a separate gasifier turbine and power turbine.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 1 illustrates in schematic fashion a recuperated microturbine engine 10 which includes a compressor 15, a recuperator 20, a combustor 25, a gasifier turbine 30, a power turbine 35, and a generator 40. In operation, the compressor 15 is operated by rotation of the gasifier turbine 30 to create a flow of compressed air which is delivered to the recuperator 20. In the recuperator 20, the flow of compressed air is preheated. The preheated compressed air flows into the combustor 25 where the compressed air is mixed with fuel and the mixture is combusted to create a flow of products of combustion. The flow of products of combustion passes through the gasifier turbine 30, which causes the gasifier turbine 30 to rotate and drive the compressor 15. The products of combustion are still quite hot and are therefore capable of driving the power turbine 35 after leaving the gasifier turbine 30. The power turbine 35 drives the generator 40. The engine 10 may also include a starting mechanism 43 that drives the compressor 15 at engine startup.

The system described above and illustrated in FIG. 1 is similar to that disclosed in co-pending U.S. patent application Ser. No. 10/253,219 ("the '219 application) filed on Sep. 24, 2002 and published as U.S. Publication No. 2003/0059295 A1. The entire contents of the '219 application are incorporated herein by reference. The single-piece power transfer assembly (described below) of the present invention may be substituted for the power turbine and sleeve pinion gear assembly described in the '219 application. The invention is also applicable to other applications, however, and the above should not be regarded as limiting.

Figure 2:
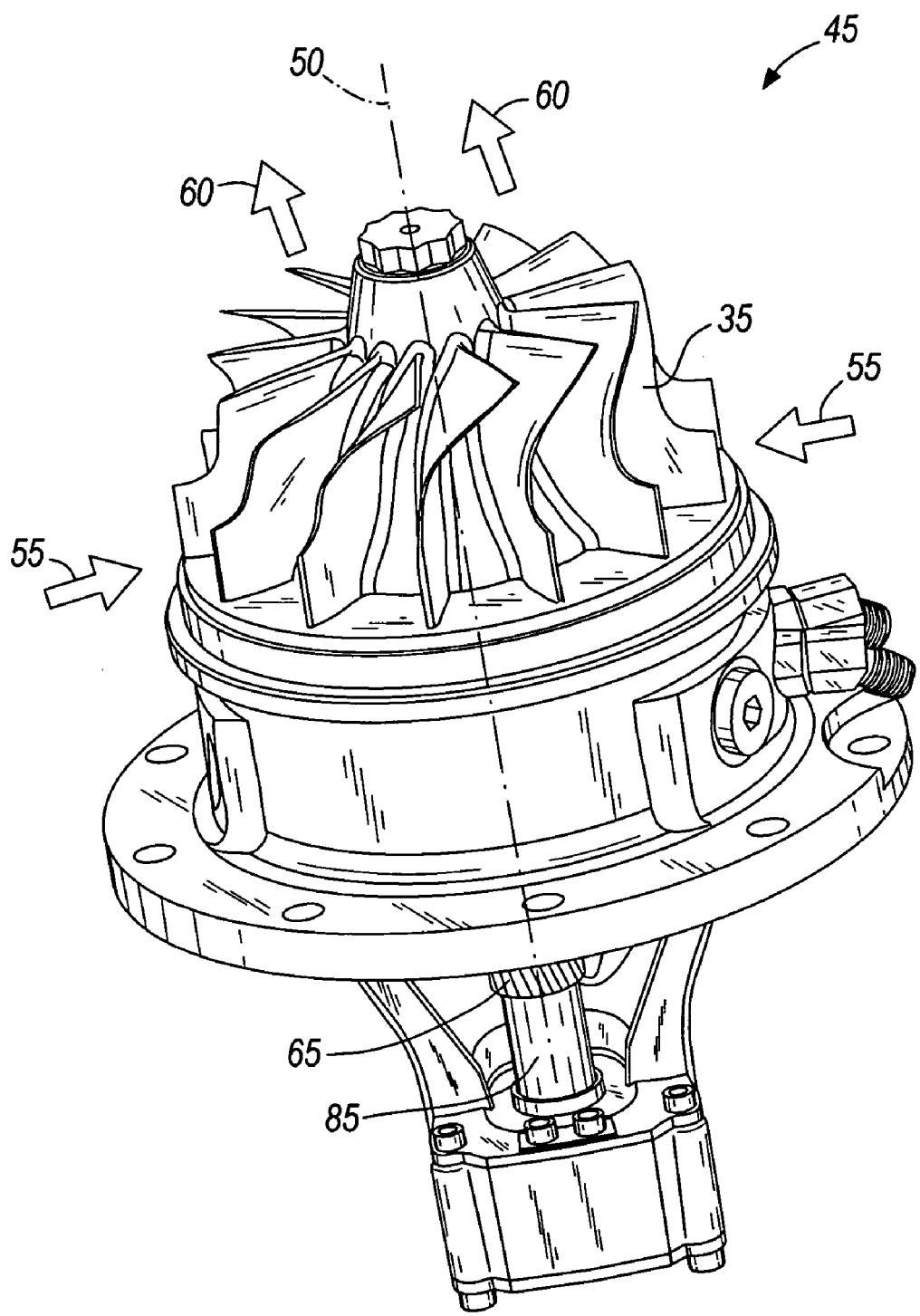
FIG. 2 is a perspective view of a power turbine cartridge portion of the engine.

FIG. 2 illustrates a power turbine cartridge 45 of the same type disclosed in the '219 application. The cartridge 45 includes the power turbine 35. The power turbine 35 is of the radial flow variety, which means that the flow of products of combustion impinge on the power turbine blades substantially perpendicular to an axis of rotation (also an axis of symmetry in the illustrated embodiment) 50 of the power turbine 35 as indicated with arrows 55. The products of combustion flow out of the power turbine 35 substantially parallel to the axis of rotation 50, as indicated with arrows 60.

Figure 3:
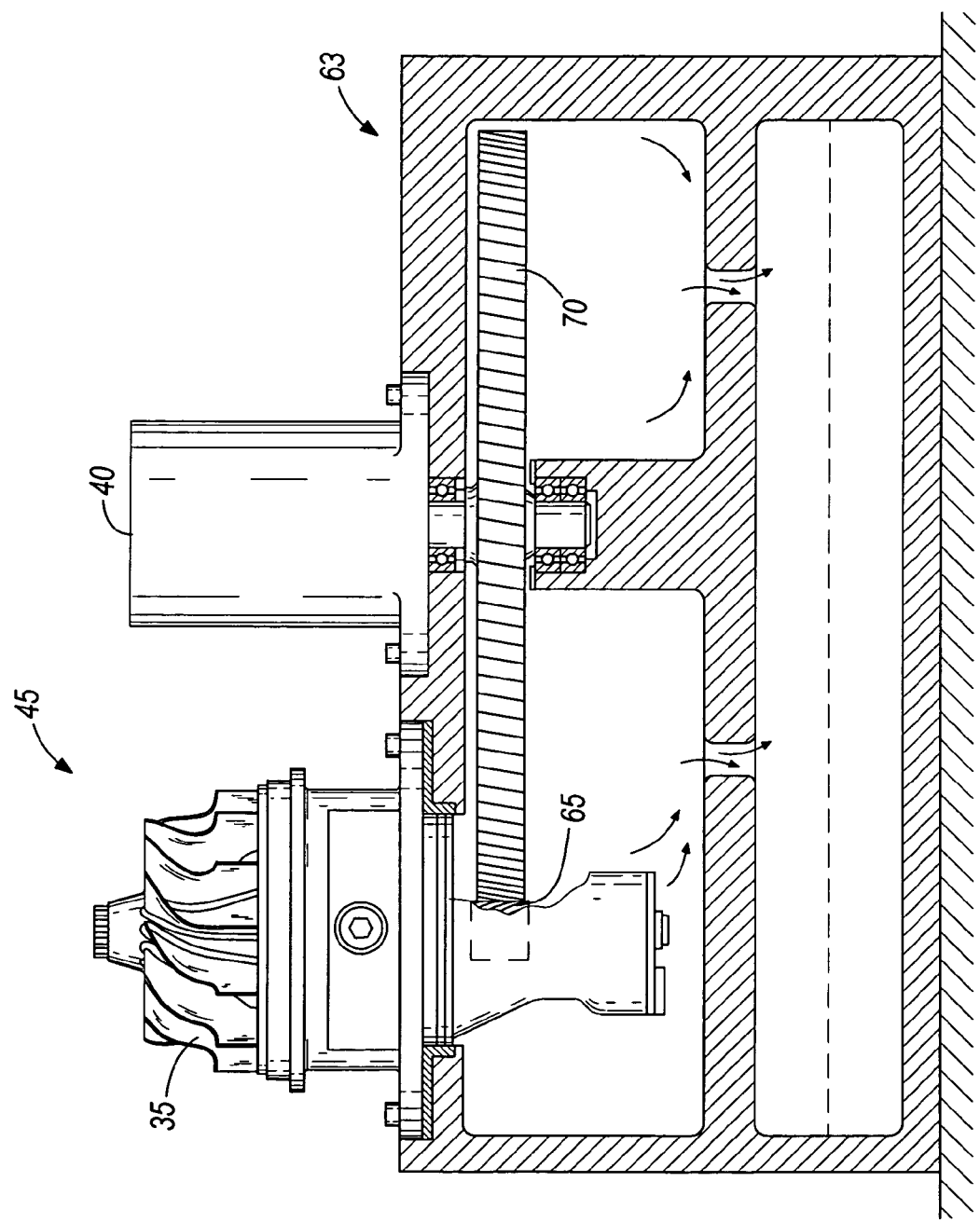
FIG. 3 is a cross-sectional view of the cartridge and gear box portions of the engine.

Turning to FIG. 3, the cartridge is mounted on a gearbox 63 that interfaces between the power turbine 35 and the generator 40. Rotation of the power turbine 35 causes an integral pinion gear 65 (which will be described in more detail below) to rotate. The pinion gear 65 in turn causes rotation of a bull gear 70 that drives the generator 40. In the illustrated arrangement, the pinion gear 65 has 23 teeth and the bull gear 70 has 281 teeth, which results in a speed reduction by a factor of about 12:1. During normal operation of the illustrated power turbine 35, the pinion gear 65 rotates at a rate of about 44,300 rpm and the bull gear 70 drives the generator at a rate of about 3600 rpm., which is a usable rotation rate for the generator 40.

Figure 4:
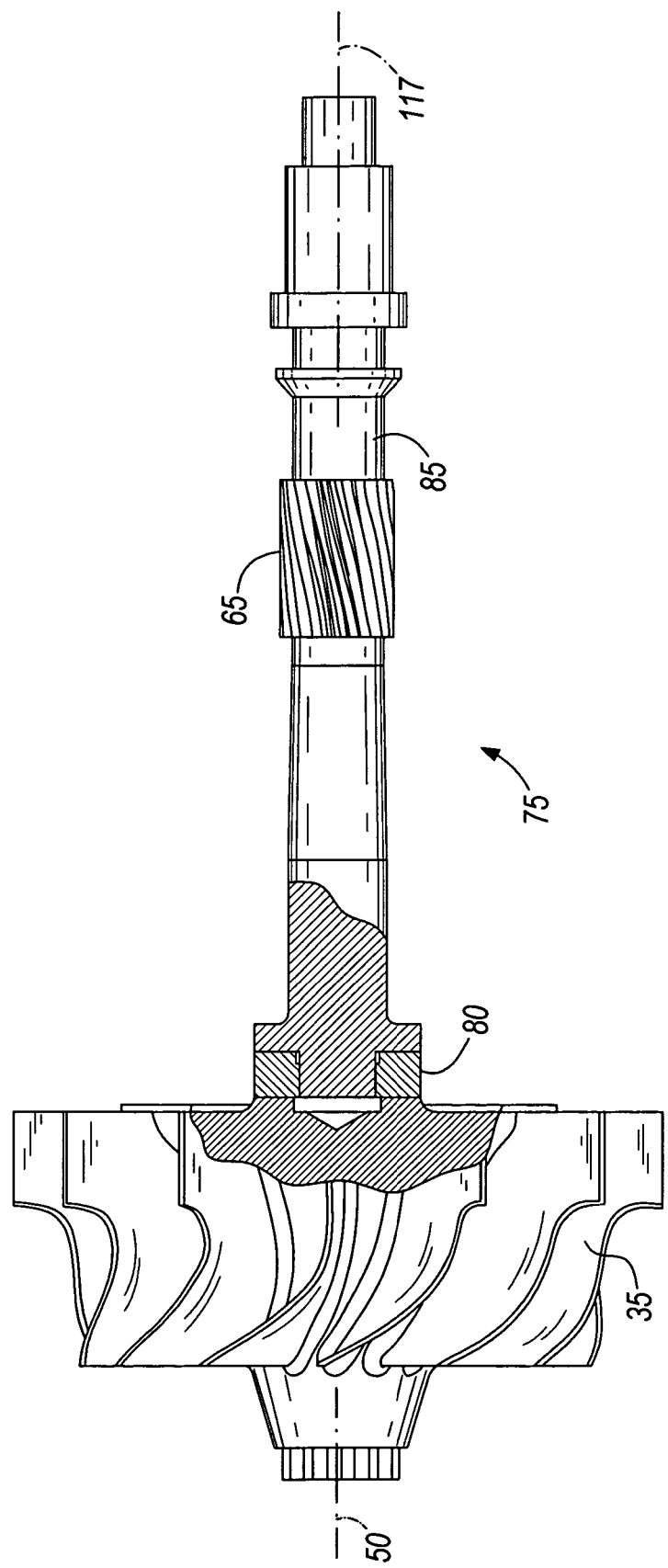
FIG. 4 is a partial cross-sectional view of the power transfer assembly.

FIG. 4 illustrates a power transfer assembly 75. In the illustrated application, the power transfer assembly 75 must withstand temperatures of about 1450° F. and 70 kW loads for at least 80,000 hours while rotating at about 44,300 rpm. The assembly includes three integral parts: the power turbine 35, a transition portion 80, and a pinion gear shaft 85 that includes the integral pinion gear 65. The transition portion 80 is formed by a portion of a stub shaft 90 (FIG. 5) that is welded to the power turbine 35 at one end and to the pinion gear shaft 85 at the other end, as will be more fully described below.

Figure 5:
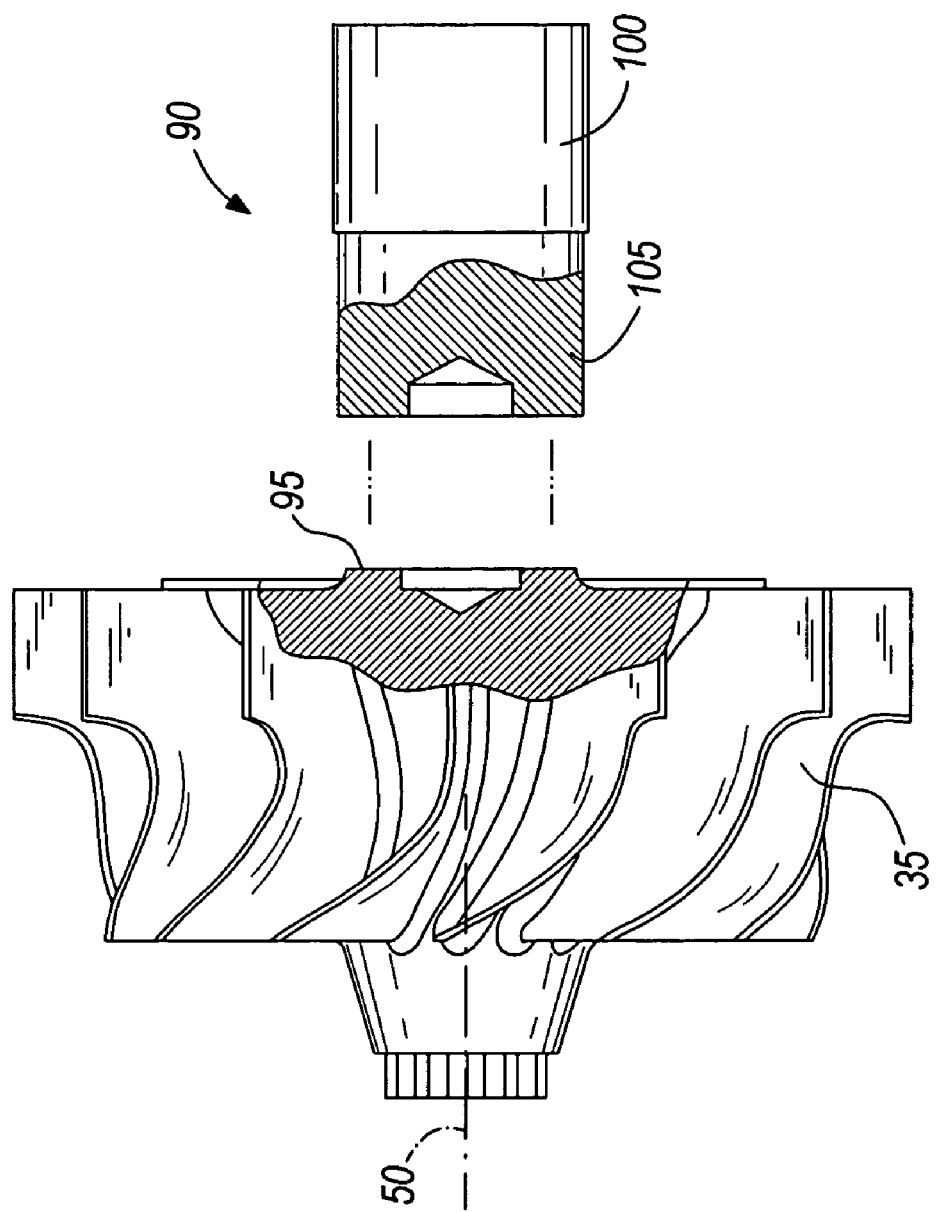
FIG. 5 is a partial cross-sectional view of the turbine wheel and stub shaft prior to the inertia welding manufacturing step.

With reference to FIG. 5, the illustrated power turbine (also sometimes called a turbine wheel) 35 is constructed of AMS 5377 Inconel 713 LC, which is a high-nickel alloy. The power turbine 35 includes a substantially flat face 95. The illustrated stub shaft 90 is made of AISI 4140 high-carbon steel having a core hardness of 32–36 HRc. The stub shaft 90 has a mounting portion 100 and a usable portion 105. The useable portion 105 of the stub shaft 90 illustrated in FIG. 5 is cylindrical and has a length of about 1 inch and a diameter of about 1.7 inches.

Figures 6, 7:
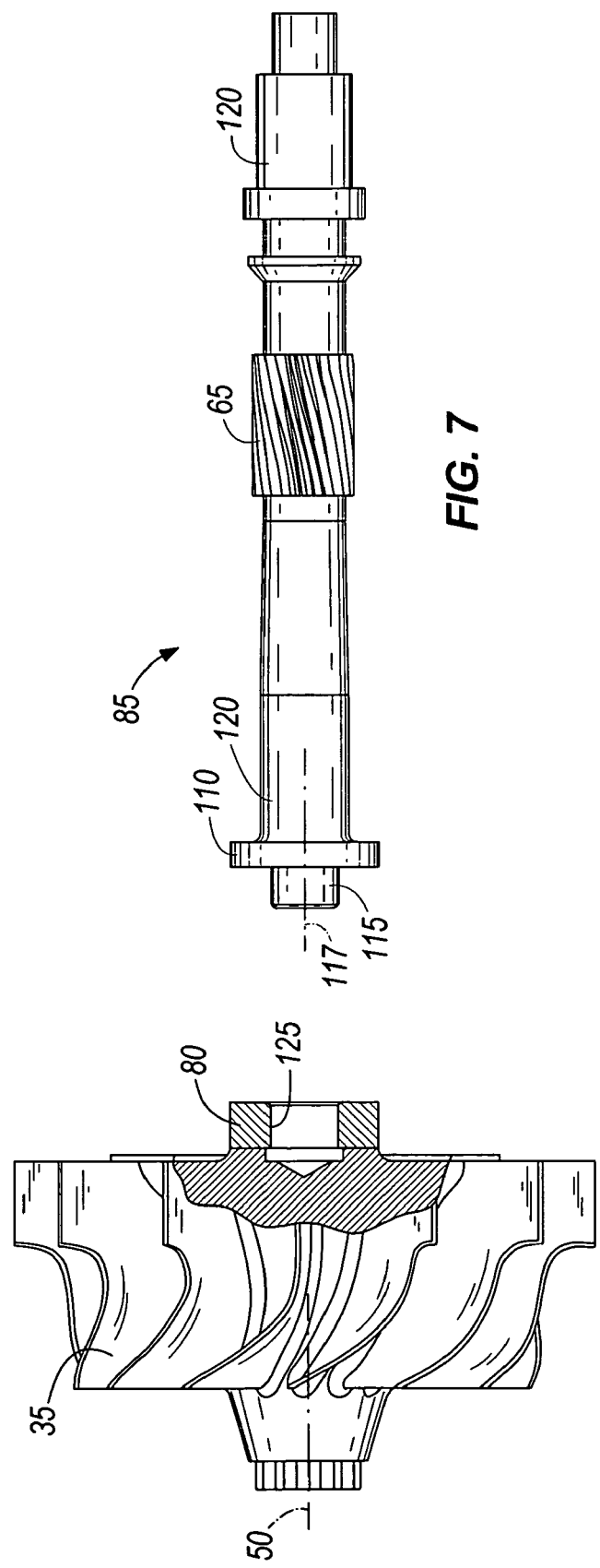
FIG. 6 is a partial cross-sectional view of the turbine wheel and stub shaft after the inertia welding and machining manufacturing steps.
FIG. 7 is a side view of the pinion gear shaft.

With reference to FIG. 7, the pinion gear shaft 85 is of sufficient length to position the integral pinion gear 65 in engagement with the bull gear 70. The illustrated pinion gear shaft 85 is constructed of 9310 low-carbon steel, which is a gear steel material that can be carburized for increased surface hardness while maintaining an acceptable core hardness for this application.

The pinion gear shaft 85 includes at one end a flange 110 and a projection 115 centered on the flange 110. The projection 115 is centered on the axis of rotation (also the axis of symmetry in the illustrated embodiment) 117 of the pinion gear shaft 85. The pinion gear 65 is integrally formed in the pinion gear shaft 85 by a precise machining process that meets the AGMA Q12 standard. The pinion gear shaft 85 also includes a pair of bearing surfaces 120 for supporting the power transfer assembly 75 for rotation in the cartridge 45. The overall length of the illustrated pinion gear shaft 85 is about 9.63 inches. The projection 115 is cylindrical and has a diameter of about 0.7201–0.7203 inches in the illustrated embodiment. The flange 110 is circular and defines around the projection 115 a ring having an outer diameter of about 1.6 inches in the illustrated embodiment.

With reference to FIG. 5, the first step for manufacturing the power transfer assembly 75 is to inertia weld the stub shaft 90 to the power turbine 35. More specifically, the mounting portion 100 of the stub shaft 90 is secured in a chuck at the center of a known inertia welding flywheel. While the flywheel rotates, the end of the usable portion 105 of the stub shaft 90 is forced against the flat face 95 of the power turbine 35 with a desired level of axial force and for a selected axial displacement. The heat of the friction causes the Inconel and 4140 steel to fuse into an inseparable joint.

In such an inertia welding system, the flywheel mass, rate of rotation, and applied axial force are known and the energy input is relatively easily calculated. The amount of material consumed during the welding process is also easily calculated based on the axial displacement of the stub shaft. Inertia welding is a well-known and convenient process for manufacturing applications because it does not require an inert environment, and is relatively simple to execute. In the illustrated embodiment, the inertia welding process meets MIL-STD-1252.

Turning to FIG. 6, the second step of manufacturing the power transfer assembly 75 includes cutting the stub shaft 90 down, machining the remaining usable portion 105 of the stub shaft 90 into the shape illustrated (i.e., into the shape of the transition portion 80), and machining a bore 125 into the remaining usable portion 105 of the stub shaft 90. The bore 125 is centered on the axis of rotation 50 of the power turbine 35. In the embodiment illustrated in FIG. 6, the transition portion 80 of the power transfer assembly 75 is cylindrical and has a length of about 0.6 inch and a diameter of about 1.6 inches, and the bore 125 has a diameter of about 0.7201–0.7203 inches.

After machining the transition portion 80 to the desired dimensions, the pinion gear shaft 85 is welded to the transition portion 80 with an electron beam welding process. More specifically, the projection 115 of the pinion gear shaft 85 fits snugly into the bore 125 in the transition portion 80 such that the flat face of the flange 110 abuts the free end of the transition portion 80. An electron beam is then run along the interface between the parts to create a permanent joint. In the illustrated embodiment, the electron beam welding process meets the AMS 2681 standard. Electron beam welding typically requires a vacuum environment, and is therefore more complex than inertia welding. However, the electron beam welding process is a relatively low energy weld and may consequently be executed with relatively little distortion in the part.

Because the bore 125 and projection 115 are centered on the respective axes of rotation 50, 117 of the power turbine 35 and pinion gear shaft 85, the axes are substantially collinear, and the power transfer assembly 75 rotates as a single integral part along a single, consistent axis of rotation. Further, because the axes of rotation 50, 117 are also the axes of symmetry for the power turbine 35 and pinion gear shaft 85, the entire power transfer assembly 75 has a single axis of symmetry about which it rotates. This helps to ensure a very precise meshing engagement of the pinion gear 65 and bull gear 70 with substantially no "wobble" in the power transfer assembly during its high-speed rotation.

What is claimed is:

1. A microturbine engine comprising:
    a recuperator having a hot gas flow path and a cool gas flow path;
    a compressor providing a flow of compressed gas to the cool gas flow path of the recuperator, the compressed gas being heated within the recuperator;
    a source of fuel providing a flow of fuel;
    a combustor receiving the heated flow of compressed gas from the recuperator and the flow of fuel from the source of fuel, and combusting a mixture of compressed gas and fuel to produce a flow of hot gas;
    a radial flow turbine receiving the flow of hot gas from the combustor and discharging a flow of exhaust gas;
    a power transfer assembly including a turbine wheel constructed of a nickel alloy, a gear shaft constructed of a low-carbon carburized gear material and having a pinion gear integrally formed therein, and a transition portion between and welded to each of the turbine wheel and gear shaft, the turbine wheel being within the radial flow turbine and rotating in response to the flow of hot gas through the turbine;
    a bull gear in meshing engagement with the pinion gear and rotating in response to rotation of the pinion gear at a speed lower than the rotational speed of the power transfer assembly; and
    an electric generator and generating electricity in response to rotation of the bull gear.

2. The engine of claim 1, wherein the power turbine is constructed of AMS 5377 Inconel 713 LC; wherein the gear shaft is constructed of 9310 steel; and wherein the transition portion is constructed of 4140 steel.

3. The engine of claim 2, wherein the integral pinion gear meets the AGMA Q12 standard.

4. The engine of claim 1, wherein the transition portion is inertia welded to the power turbine and is electron beam welded to the gear shaft.

5. The engine of claim 4, wherein the inertia weld meets the MJL-STD-1252 standard and the electron beam weld meets the AMS 2681 standard.

6. The engine of claim 1, wherein the power turbine and gear shaft each have axes of symmetry that are collinear with each other, and wherein the power transfer assembly rotates about an axis of rotation that is substantially collinear with the axes of symmetry.

7. The engine of claim 1, wherein the gear shaft includes first and second bearing surfaces, the engine further comprising first and second bearings supporting the gear shaft at the first and second bearing surfaces for rotation at about 44,300 rpm.

* * * * *